A. B. NORRIS.
MULTIPLE TURNING LATHE.
APPLICATION FILED SEPT. 17, 1908.

954,456.

Patented Apr. 12, 1910.
9 SHEETS—SHEET 1.

Fig. 1.

WITNESSES

INVENTOR.
A. B. Norris.
BY
ATTORNEY.

Fig. 2.

A. B. NORRIS.
MULTIPLE TURNING LATHE.
APPLICATION FILED SEPT. 17, 1908.

954,456.

Patented Apr. 12, 1910.
9 SHEETS—SHEET 3.

Fig. 3.

WITNESSES:

INVENTOR.
A. B. Norris.
BY
ATTORNEY.

A. B. NORRIS.
MULTIPLE TURNING LATHE.
APPLICATION FILED SEPT. 17, 1908.

954,456.

Patented Apr. 12, 1910.
9 SHEETS—SHEET 4.

Fig. 4.

WITNESSES:

INVENTOR.
a. B. Norris.
BY
ATTORNEY.

A. B. NORRIS.
MULTIPLE TURNING LATHE.
APPLICATION FILED SEPT. 17, 1908.

954,456.

Patented Apr. 12, 1910.
9 SHEETS—SHEET 7.

INVENTOR.
A. B. Norris.
BY
ATTORNEY.

A. B. NORRIS.
MULTIPLE TURNING LATHE.
APPLICATION FILED SEPT. 17, 1908.

954,456.

Patented Apr. 12, 1910.
9 SHEETS—SHEET 9.

WITNESSES

INVENTOR.
A. B. Norris.
BY
ATTORNEY.

UNITED STATES PATENT OFFICE.

ARTHUR B. NORRIS, OF ROCHESTER, NEW YORK.

MULTIPLE TURNING-LATHE.

954,456.

Specification of Letters Patent. Patented Apr. 12, 1910.

Application filed September 17, 1908. Serial No. 453,429.

*To all whom it may concern:*

Be it known that I, ARTHUR B. NORRIS, a citizen of the United States, residing at Rochester, in the county of Monroe and State of New York, have invented certain new and useful Improvements in Multiple Turning-Lathes, of which the following is a specification.

This invention is a machine or lathe for turning a plurality of irregular forms, after a pattern.

It is particularly adapted and intended for turning lasts, but is applicable for the purpose of turning other irregular articles, and no limitation with respect to the invention is implied by reason of the particular kind of work in connection with which it is illustrated herein. As applied to a last machine, it will turn rights or lefts from the same pattern, and a further characteristic of the machine is that it can be adjusted to turn various sizes of lasts or other articles from the same pattern, the variation produced including the length and also the width or cross-sectional dimensions.

The machine includes a single rotary cutter which travels longitudinally of the work, and is located centrally of the work holders or spindles, which have lateral movements controlled by the pattern.

The machine includes mechanism to vary the relative speed of the cutter shaft and the spindles, with respect to the rotation and also with respect to the longitudinal travel, thereby controlling the finish given the work, the time of operation, and the smoothness of the cut.

The machine also includes means for allowing a lateral movement of the follower or wheel which follows the pattern, operative in the event of relative variation in the sizes of the work and the pattern, and also capable of use, reversely, for varying the shape of the work without variation in size. The relative movement or yielding of the follower is essential to preserve proper cross-sectional proportions of the finished work in the event that the machine is set for variation in the length of the work with respect to the pattern. The follower travels along the pattern contemporaneously with the movement of the cutter, in the same direction, and variation in the length of the work is produced by devices for varying the extent of relative travel of the cutter and the follower. When the work is the same size as the original pattern the longitudinal movements of the cutter and follower are identical, variation being produced by increasing or decreasing the travel of one with respect to the other.

The machine is also characterized by various other improvements and novelties with respect to mechanical construction and manner of operation, as will be more fully pointed out hereinafter.

The machine is illustrated in the accompanying drawings in which—

The frame of the machine comprises a hollow base A which supports a spider A' consisting of vertical webs arranged radially from a central tube, the webs having reinforcements at the top. The substantially rectangular fixed top frame $A^2$ is mounted and supported upon the spider by rods G, four in number, and set equal distances apart at the corners of a square. These rods extend through sleeves I, which will turn thereon, as hereinafter described. The frame of the machine also includes a guide plate $A^3$ which stands upon the base of the frame beside the spider A', and this guide plate forms the back of a box which serves to inclose gearing and other parts to be described, said box being completed by a side plate $A^4$ which also supports certain bearings and devices, an opposite side plate $A^5$ which also forms a box for controlling shaft and gearing, and a front plate $A^6$, these various plates being shaped to support parts to be hereinafter described. A door $A^7$ and removable plate $A^8$ permit access to the inside of the base.

For driving the rotary cutter power is supplied by a belt passing over guide pulleys R and around a pulley $R^2$ on a shaft section $R^4$ which turns in a step bearing $R^3$ in the bottom of the machine. The upper end of said shaft section projects into an upper shaft section $R^5$, the shaft sections being connected by a key $r^4$ in a long keyway, permitting vertical extension of the shaft the upper end of which carries the cutter head $R^7$ with cutter blades $r'$. The upper section of the cutter shaft turns in a sleeve $R^6$ which is raised and lowered by a feed mechanism to be described, thereby raising and lowering the cutters which in operation work from the top downwardly.

Figure 4:
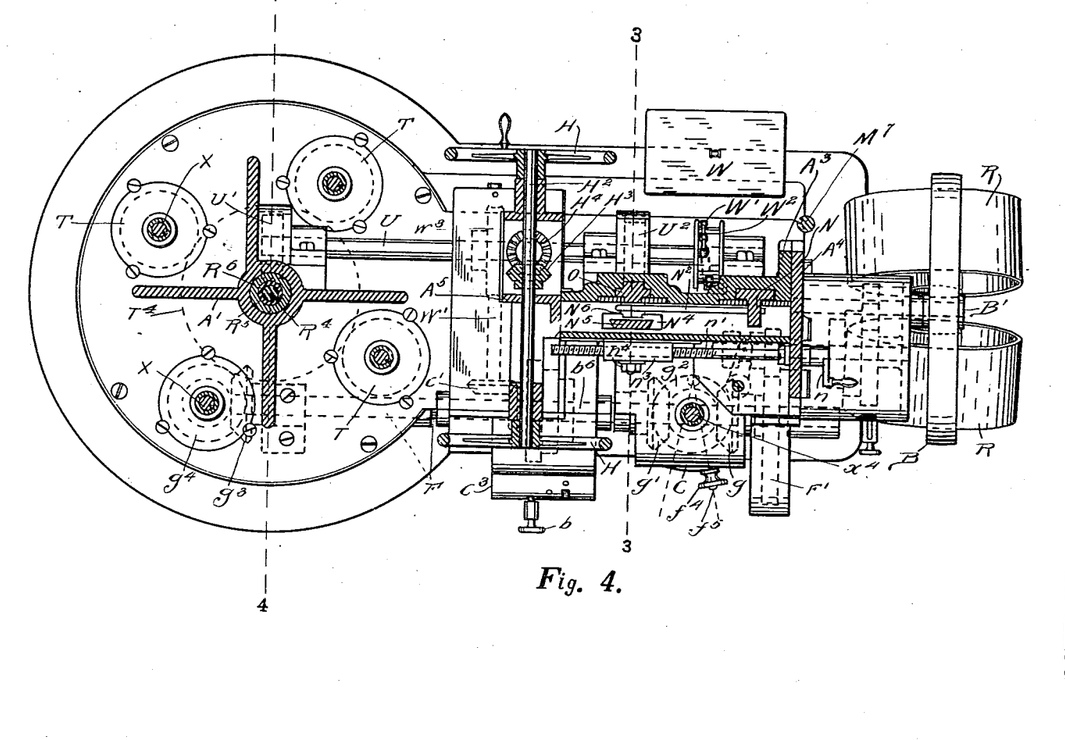
Fig. 4 is a section on the line 2—2 of Figs. 1 and 2.
Figure 6:
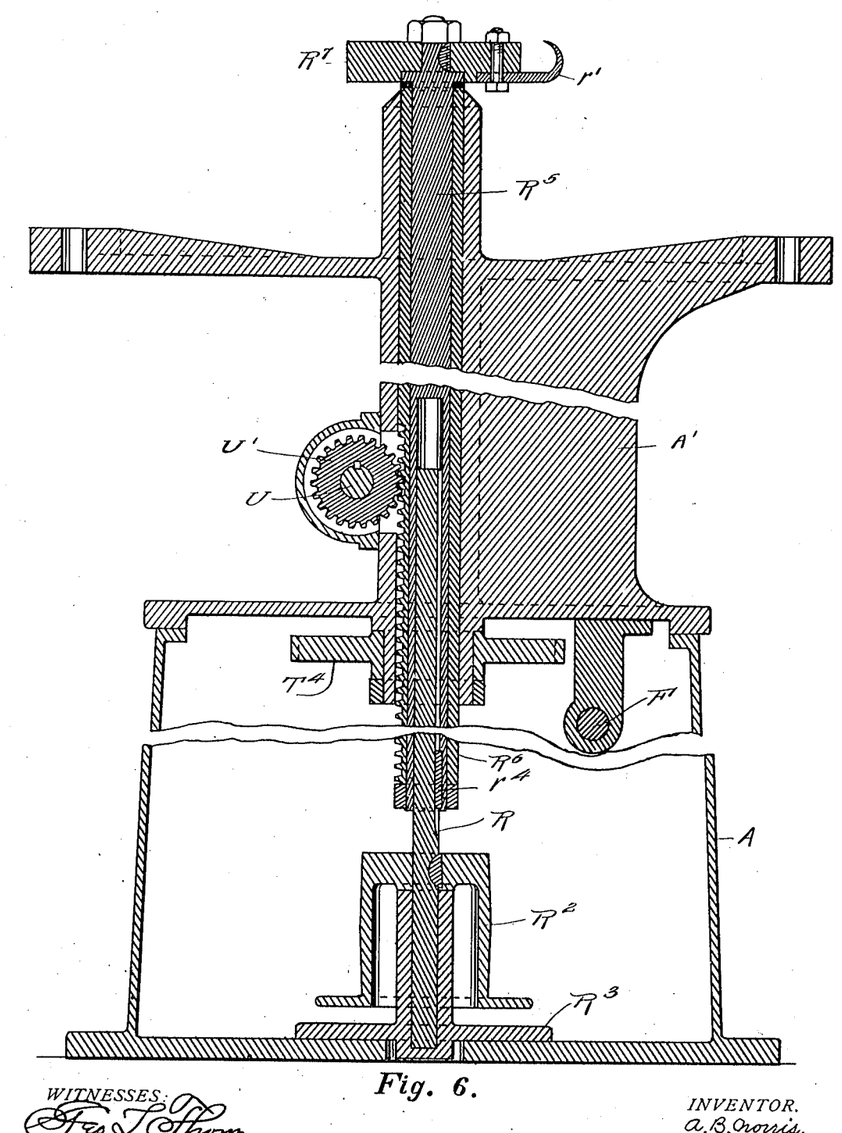
Fig. 6 is a vertical section on the line 4—4 of Fig. 4.
Figure 8:
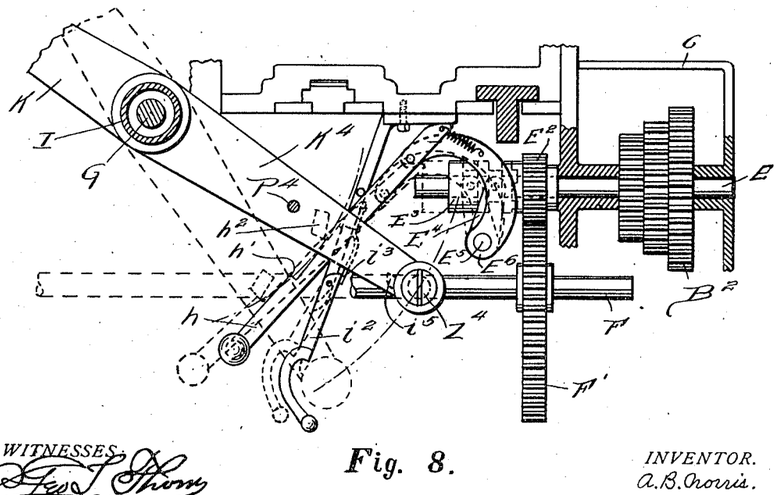
Fig. 8 is a detail in plan of disconnecting devices for the feed mechanism, and stop mechanism for the spindles, as well as a catch for holding the spindles away from the cutter while the work is being changed.

For driving the work and pattern spindles and for operating the feed, power is supplied to a pulley B on a counter shaft $B'$ which drives a second shaft E through speed-changing gearing indicated at $B^2$, and contained in a box C. The purpose of the second way-shaft E is to reduce speed. It carries a loose pinion $E^2$ (see Fig. 8) engageable by a sliding sleeve clutch $E^3$, which may be operated as hereinafter described, and which when engaged drives the main shaft F through gear $F'$ thereon. This shaft F is supported by suitable hangers and bearings on the base of the machine, and by means of beveled gears $g^3$, $g^4$ drives one of the extensible shafts X of the work spindles. These shafts are made extensible and flexible by known devices in order to permit the variation incident to the swing of the work holders, as controlled by the pattern. The lower section of each spindle shaft has a pinion T thereon which meshes with a central gear $T^4$, see Figs. 4 and 6, so that all the spindles are driven, the central gear $T^4$ being mounted upon a sleeve bearing depending from the top plate of the base.

The upper ends or sections of the shafts X are carried in bearings Y at the free ends of arms K, and drive the head centers Z upon which the work pieces L are mounted. The arms K are fast on sleeves I which turn to the necessary extent on the rods G. The tail spindles $j$ are carried by arms J, corresponding to the arms K, and these arms J are also clamped to the sleeves I. The arms J and K are connected and braced by rods P, to preserve the alinement and to prevent spring of the arms. The work pieces are thereby held in position around the cutter head so that the cutters will operate on the work as the cutter shaft is rotated, and fed downwardly, the work holding arms swinging laterally in accordance with the pattern section, and the work spindles being at the same time rotated by the shafts X which, as stated, have universal joints and are extensible to permit the lateral movement.

In order to produce similar movement of all the work holding arms, the sleeves I are provided with fixed bell crank levers D, the respective opposite arms of which are connected by parallel rods $d$, so that when one sleeve or arm is swung in or out the other arms are swung in the same direction with reference to the cutter head and to the same extent, producing parallel motion of the opposite work holding spindles.

The pattern spindle is driven from the shaft F by reversing gearing in the box $C^2$, said gearing including opposite beveled pinions $g$, $g'$ loose on the shaft F, with sliding clutch $f^6$ between, controlled by a shifter $f^5$ projecting through a slot in the front of the box and having a spring catch knob $f^4$ to hold it as set. The pinions $g$, $g'$ mesh with a beveled pinion $g^2$ on the lower end of the lower section of a flexible and extensible shaft $x^4$, similar to the shafts X above described, and the upper section of said shaft carries the head pattern center $Z^4$ and is supported in a bearing at the end of an arm $K^4$ which is integral with one of the arms K and fixed to the sleeve I. The pattern is indicated at M held between the center $Z^4$ and the tail center $j'$ carried by an arm $J^4$ integral with one of the upper arms J. The arms $J^4$ and $K^4$ are connected and braced by a screw rod $P^4$.

It is evident that lateral motion imparted to the pattern carrying arms $J^4$ and $K^4$ will be correspondingly communicated to the work carrying arms J and K, all of said arms being of equal length as will be understood, and consequently the work is given lateral movement with respect to the cutter corresponding to the lateral movement incident to the pattern section, the pattern rotating in contact with a follower wheel $M'$ which is supported by a slide N, to be described. The follower wheel is equal in diameter with the cutter as a whole, in order to produce symmetrical movement, and it may be remarked that the curvature of the wheel should not be less than that of any depression in the pattern, otherwise the wheel would not fully enter said depression. The centers of the cutter shaft, the arms $J^4$ and $K^4$ and the follower wheel $M'$ are in line, although the latter may be slightly varied for a purpose to be hereafter described.

The reversing gearing operated by the lever $f^5$ permits the direction of rotation of the pattern M to be reversed, the direction of rotation of the work pieces L remaining the same. This produces a reverse operation of the turning devices, and in a last machine will produce a left hand last from a right hand pattern, or vice versa, or, in other words, by changing the gearing, either rights or lefts may be made from the same pattern, which is a highly advantageous result in last turning.

Figure 1:
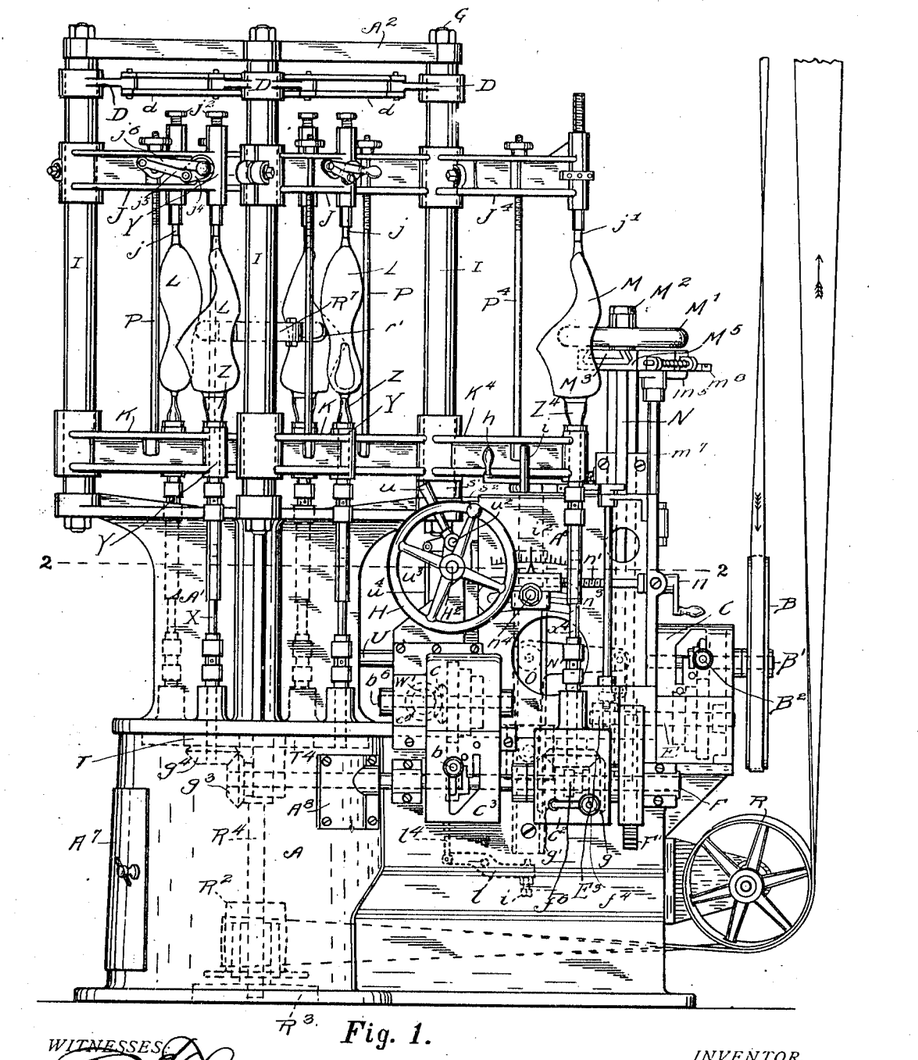
Figure 1 is a front elevation thereof.
Figure 2:
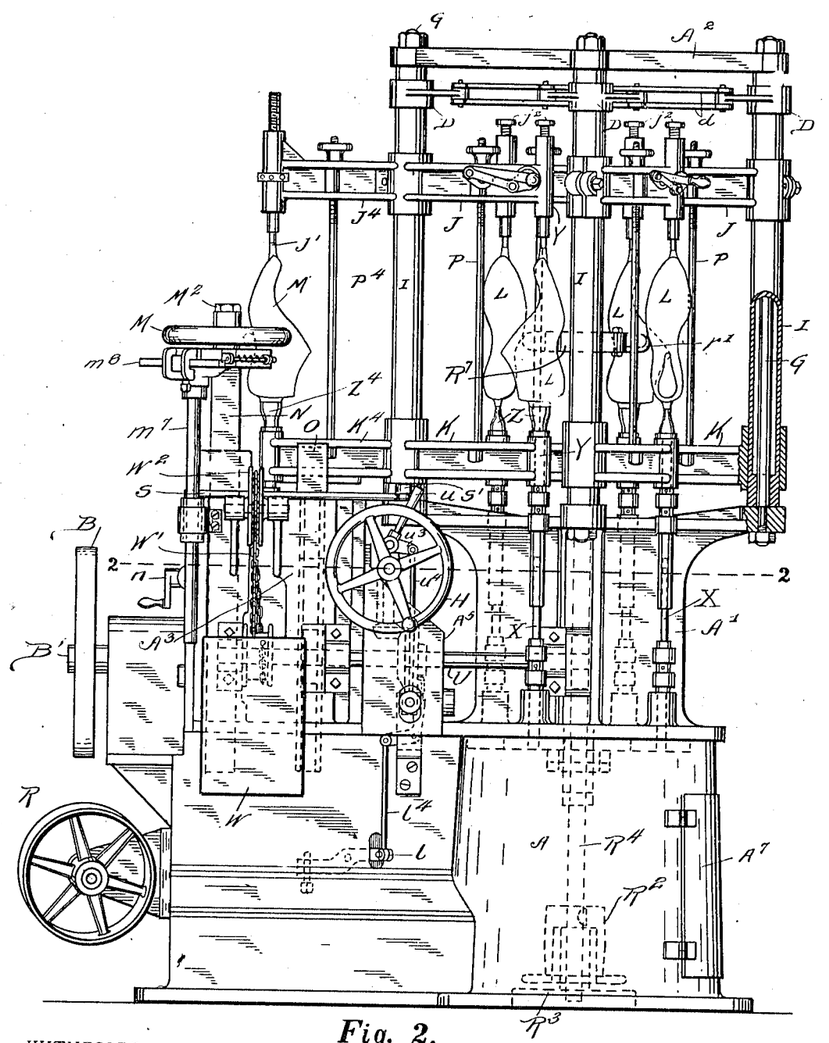
Fig. 2 is a rear elevation.
Figure 3:
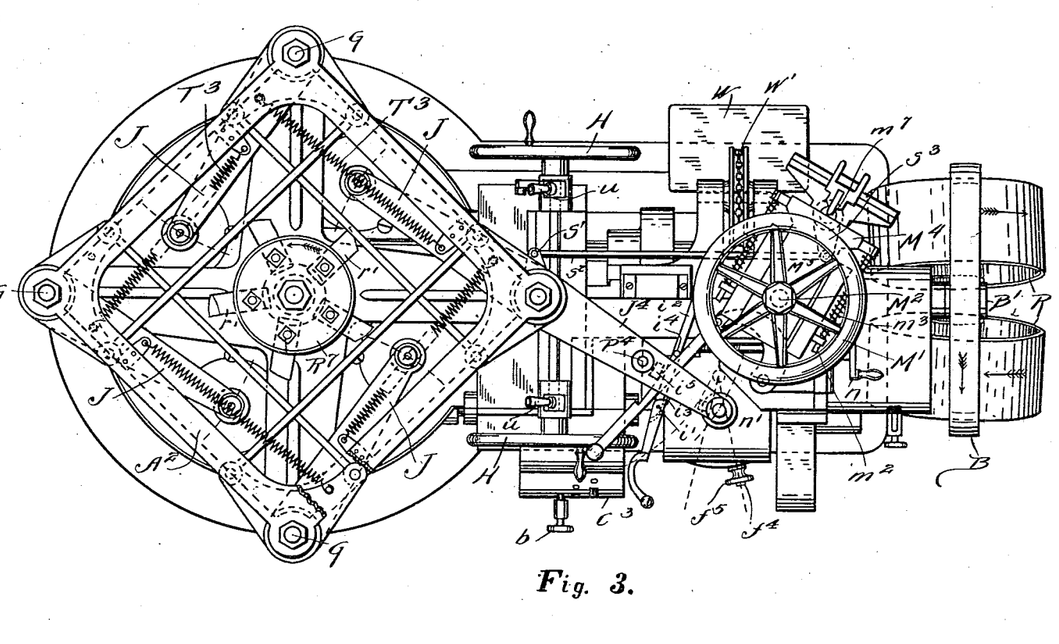
Fig. 3 is a plan.
Figure 5:
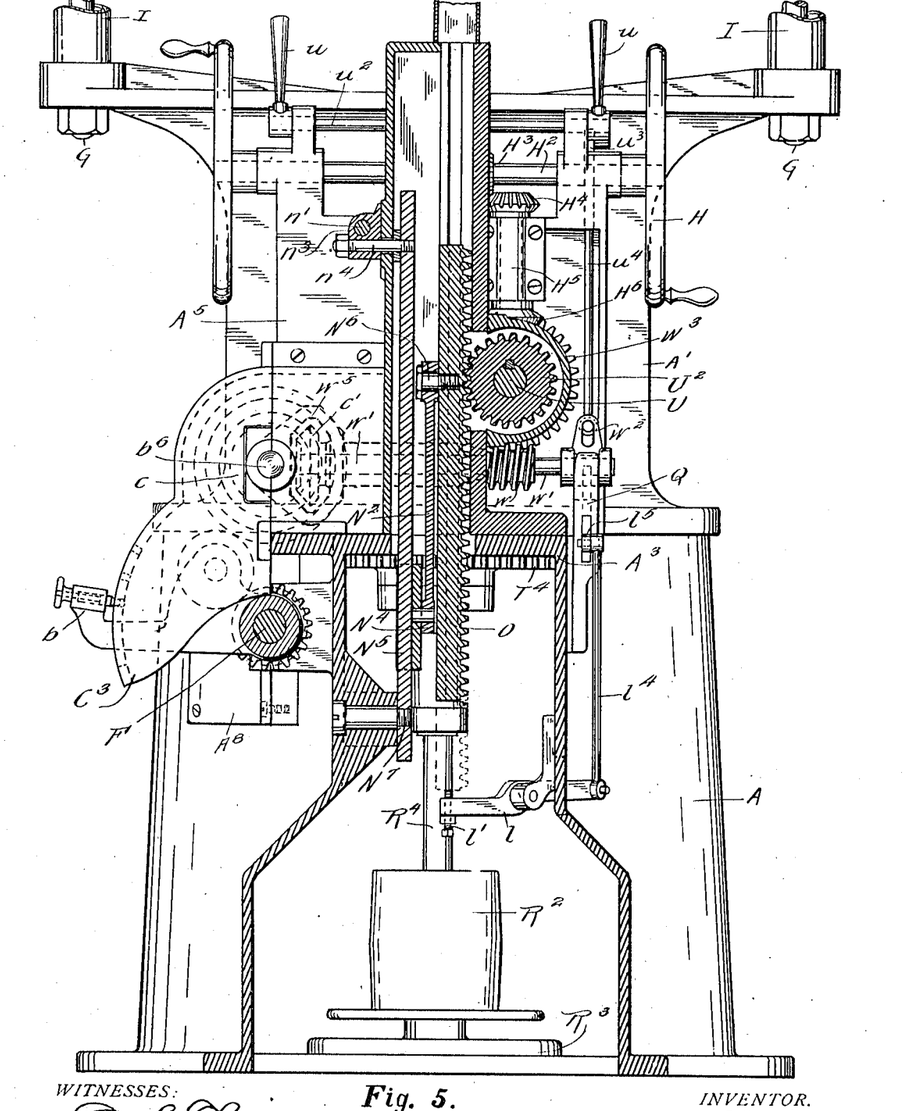
Fig. 5 is a vertical section on the line 3—3 of Fig. 4.
Figure 7:
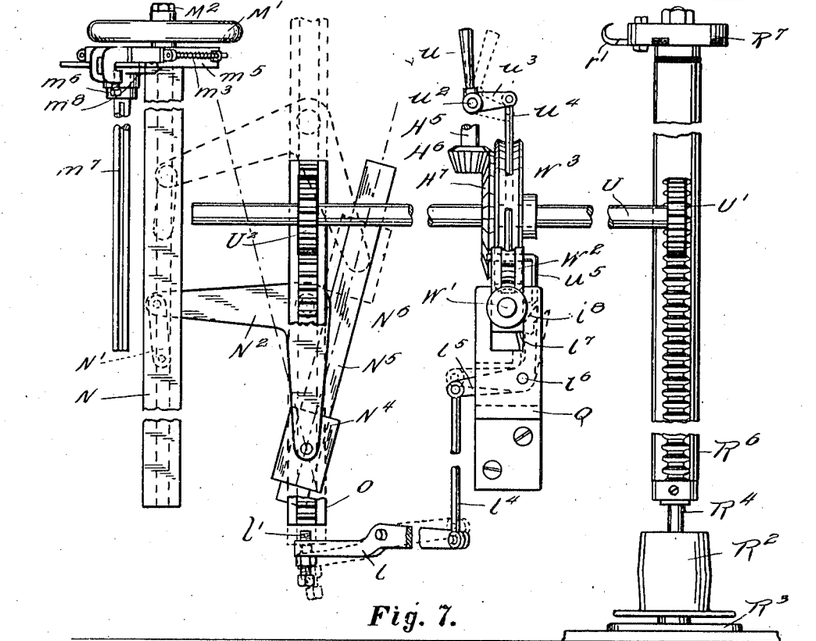
Fig. 7 shows details in elevation of the mechanism for varying the relative travel of the cutter and the follower, operative in producing work varying in size from the pattern. This view also shows stop devices for the feed.

For producing the vertical feed of the follower and of the cutter a cross shaft U is provided, mounted in suitable bearings at the back of the spider and the upright back plate $A^3$. This shaft is driven by gearing from the main shaft F, said gearing including a known speed-changing gear contained in the box $C^3$ and controlled by a lever $b$, and indicated in dotted lines in Figs. 1 and 5, the purpose being for varying the longitudinal feed with respect to the speed of rotation of the spindles. The speed-changing gear includes a shaft $b^6$ having a beveled gear $c$ which meshes with a beveled gear $c'$ on the end of a worm shaft $w'$ the worm $w$ of which engages a gear $w^3$ on the shaft U which carries to pinions $U^1$ and $U^2$, the former of which operates the cutter feed and the latter of which operates the follower feed. The pinion $U'$ engages a rack on the sleeve $R^6$ (see Fig. 6) which carries the extensible cutter shaft heretofore described and thereby raises or lowers the cutter according to the rotation of the shaft U. The other pinion $U^2$ engages a rack bar O which slides up and down in guides in the back plate $A^3$, and is pivotally connected at $N^6$ to the elbow of a bell crank lever $N^2$ (see Figs. 5 and 7) one arm of which is connected to a saddle $N^4$ which travels on a slide bar $N^5$, and the other arm is connected by a link $N'$ to the sliding bar N which also slides in guides in the back plate $A^3$ and which carries the follower $M'$. The bar $N^5$ is pivoted at its lower end, at $N^7$, and the upper end is connected by a bolt $n^4$ to a block $n^3$ which may be moved to the right or left by a screw $n'$ operated by hand crank $n$. The bolt $n^4$ works in a slot in the front plate $A^6$.

It will be seen that when the shaft U is turned the travel of the slide N and the cutter shaft will be identical if the bell crank lever is set square with the slide N and bar $N^5$, that is, if said slide and bar are parallel, but if the bar $N^5$ is swung to one side or the other by operation of the crank $n$, the depending arm of the bell crank lever $N^2$ will be swung to one side or the other, and this swing will progressively vary as the rack O travels, the direction of which is downward, in the cutting operation, thereby progressively varying the relative vertical movement of the follower slide N, and consequently progressively varying the relative vertical movement of the follower wheel and the cutter head, whereby the length of the forms or work produced will be increased or decreased. And so forms of various lengths may be produced from the same pattern.

For disconnecting the feed, hand levers $u$ are provided, mounted on the front and rear ends of a shaft $u^2$ having a crank arm $u^3$ connected by rod $u^4$ to a hanger $w^2$ at the outer end of the worm shaft $w'$, the inner or front end of which is mounted in a yoke $w^5$ which swings on the shaft $b^6$, and permits the worm shaft to be raised or lowered to engage or disengage the worm from the worm wheel $w^3$. The same result is automatically accomplished by means of a lever $l$ having a strike screw $l'$ at one end in line with the rack bar O and arranged to be struck thereby when said bar is at the limit of its downward movement. The lever is connected by rod $l^4$ to a latch $l^5$ pivoted at $l^6$ to a bracket Q and having a shoulder $l^7$ arranged to engage under the hanger $w^2$ which slides in a slot in the bracket. When the rack bar O strikes the lever the latch is disengaged and the worm shaft will drop by its own weight and disengage the gearing. The rod $u^4$ of the hand device carries a finger $u^5$ which when the stop lever is turned pushes against the beveled end $l^8$ of the latch and so disengages the same to allow the hanger to drop.

The feed shaft U may be operated by hand, crank wheels H being mounted on the front and rear ends of a shaft $H^2$ carrying a beveled gear $H^3$ meshing with a beveled gear $H^4$ at the upper end of a shaft $H^5$ having a beveled gear $H^6$ at its lower end meshing with a beveled gear $H^7$ on the shaft U. A counter weight W is connected by a chain $W'$ to the wheel $W^4$ on the shaft U, the chain passing over a pulley $W^2$, the purpose of the counter weight being to assist in raising the feed mechanism described. The two levers $u$ and wheels H are provided simply for convenience, to allow for operation at either the front or the back of the machine.

The clutch $E^3$, which controls the operation of the machine, may be engaged or disengaged by the hand rod $h$ which is connected to a bent arm $E^6$ projecting from a vertical rock shaft $E^5$ which has an arm $E^4$ (see Fig. 8) which shifts the clutch. When the finished work is to be removed from the lathe, or new blocks substituted, the arm $K^4$ is swung out by hand (see dotted lines in Fig. 8), and in order to simultaneously stop the machine, the arm $K^4$ has a depending lug $h^2$ located in proper position to strike a shoulder $h'$ on the pull rod $h$, and so when the arm is swung out to renew the work or the pattern the clutch E will be disengaged and the machine will be stopped. The springs $t^3$ connected between the top frame $A^2$ and the arms of the bell cranks D tend, of course, to press the work toward or against the cutter and to swing the arms $K^4$ toward the follower, to keep the pattern in contact therewith. To hold the work spindles and the pattern spindle away from the cutter and follower respectively, as when the work is being changed, a latch $i$ is provided supported by an arm $i^2$ and pressed by a spring $i^3$, behind the pivot $i'$ of the latch, which is properly shaped and located to catch behind a projection $i^5$ at the outer end of the arm $K^4$, as shown in dotted lines in Fig. 8. When the catch is released the springs will swing the work to the cutter and the pattern to the follower.

Figure 9:
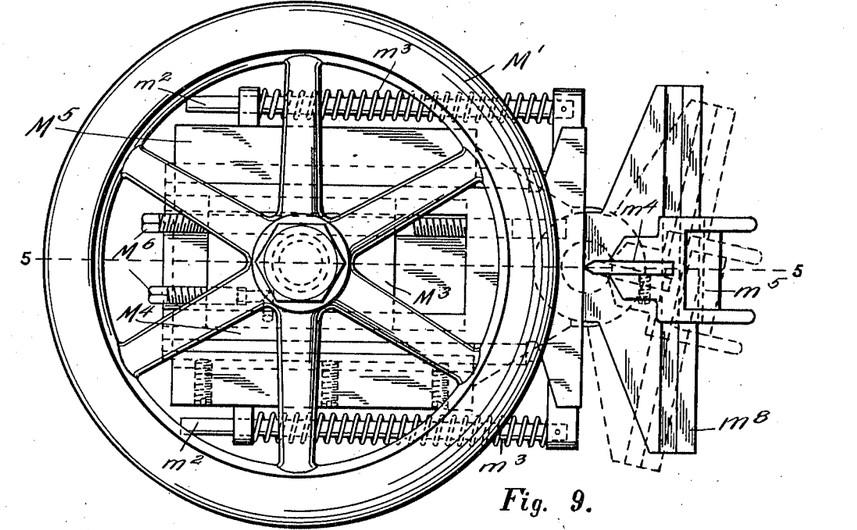
Fig. 9 is a detail in plan of mechanism for varying the relative lateral movement of the pattern follower, in order to properly proportion the cross-sectional dimensions of the work when the length thereof is increased.
Figure 10:
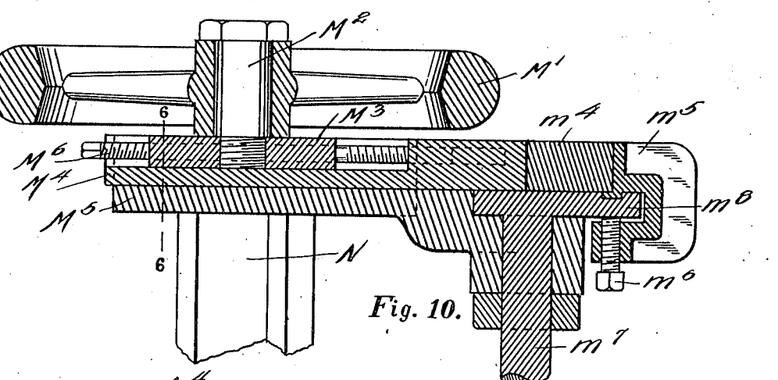
Fig. 10 is a section on the line 5—5 of Fig. 9.
Figure 11:
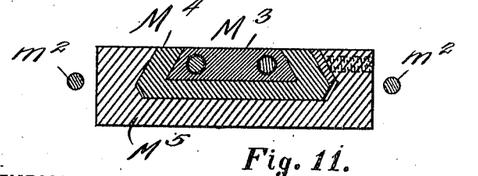
Fig. 11 is a section on the line 6—6 of Fig. 10.

When the length of the work produced is varied with respect to the length of the pattern, as above described, it is desirable, in order to produce proper cross-sectional proportions of the work, that variation be made in the lateral relation of the follower and the pattern, whereby the swing of the arms will be increased or decreased in a suitable proportion to correspond to the increased or decreased length of the work produced. To this end the follower wheel $M'$ is carried by a stud $M^2$ on an adjustable slide $M^3$ which may be adjusted by screws $M^6$, and is in turn carried in a slide $M^4$ mounted on a plate $M^5$ at the upper end of the slide N. Said plate also supports and has a bearing for the upper end of a shaft $m^7$ having at the top a plate $m^8$ extending laterally and provided with a tongue and groove connection with an adjustable block $m^5$ which may be fastened at any position along the plate by means of a set screw $m^6$. The edge of the slide $M^4$ is in line with the center of the shaft $m^7$, and the block $m^5$ has a reduced edge $m^4$ bearing against the edge of said slide $M^4$. The shaft $m^7$ is movable up and down with the slide N, being guided by a sleeve bracket $s^4$. Springs $m^3$ coiled around rods $m^2$ press the slide $M^4$ to contact with the edge $m^4$. The sleeve I having the pattern arm $K^4$ is provided with a crank arm $s'$ connected by a rod $s^2$ to a crank arm $s^3$ projecting from the shaft $m^7$, the connection being formed by means of a slot and key to allow vertical movement of the shaft. When the arm $K^4$ vibrates laterally in consequence of the pattern section, the connections described cause the shaft $m^7$ to turn or rock. If the block is set with its edge $m^4$ at the axis of the shaft $m^7$, which is at the middle of the edge of the slide $M^4$, the plate $m^8$ will be rocked, but this will have no effect on the slide $M^4$. If, however, the block $m^5$ be shifted one way or the other from the middle, bringing its edge $m^4$ out of line with the axis of the shaft $m^7$, said point will bear against the slide $M^4$ at a point out of line with said axis, and when the plate $m^8$ is rocked in consequence of the turn of the shaft $m^7$ the point $m^4$ will press against the slide $M^4$ and so advance said slide, when rocked in one direction, against the tension of the springs $m^3$, and will consequently vary the center $M^2$ with respect to the axis of the pattern, or, in other words, will push the pattern wheel toward the pattern when the rock movement is in one direction, or allow the springs $m^3$ to push it away from the pattern, or rather away from the normal pattern axis, when rocked in the other direction, and this consequently will vary the resulting swing of the arms $K^4$ and $J^4$ and consequently of the work carrying arms. Explaining further, it may be said that when the block $m^5$ is shifted to one side or the other, it forms, in connection with the plate $m^8$, a crank arm or lever with respect to the shaft $m^7$, bearing against the slide $M^4$ and causing, or permitting, movement of said slide incident to the oscillation of the pattern arms produced by the pattern section, through the connections $s'$, $s^2$ and $s^3$, and so the swing of the arms is augmented or diminished to give the requisite proportions to the finished work. The block $m^5$ will be shifted by hand to a proper position whenever the length varying devices (operated by the crank $n$) are shifted. In other words, when the machine is set to make work differing in length from the pattern, the block $m^5$ will be shifted and set to make the cross-sectional proportions proper according to the length to be made, whereby the proper proportions of the finished work will be obtained, both with respect to length and cross-section.

Figures 12, 13, 14:
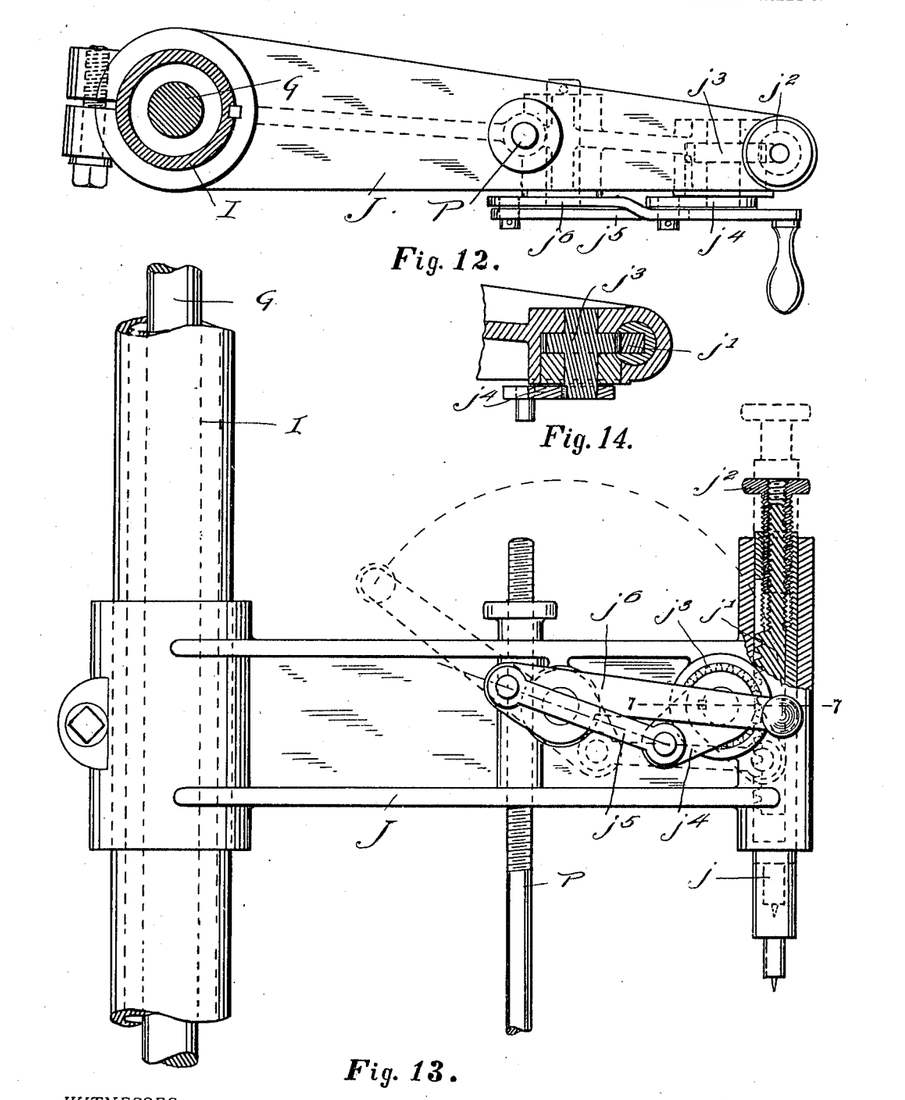
Fig. 12 is a plan of quick release devices for the spindles or work holders.
Fig. 13 is an elevation of the same.
Fig. 14 is a detail in section on the line 7—7 of Fig. 13.

In Figs. 12, 13 and 14 a quick release for the work is illustrated. The tail center $j$ has a groove therein containing a rack $j'$ which has a threaded stem which receives a nut $j^2$ with right and left threads on the outside and inside, respectively, the outside threads engaging corresponding threads in a bore in the top of the center-piece. The screw construction allows adjustment of the center. The rack is engaged by a pinion $j^3$ having a crank arm $j^4$ connected by a link $j^5$ to a hand lever $j^6$ which may be swung over to turn the pinion and thereby advance or retract the tail center to engage or release the work. When the lever is swung over to engage the work the link passes across the fulcrum point of the lever, or slightly beyond, and thereby forms a lock for the lever and consequently for the tail center. The arms J may be set up or down on the sleeves I to rough adjustment, and fixed by clamp screws $k$.

The block $M^3$ is locked at adjustment in slide $M^4$ by means of a screw $M^7$ the end of which presses against a beveled pin $f$ which in turn bears against the beveled end of a lateral extending pin $f'$ which when the screw is advanced binds against the side of the slide.

It is to be understood that the means for varying the length of the work, and the means for varying the width of the work are independent, and one can be varied without the other, if desired. Thus, in making lasts, the length-controlling devices may be set at a certain size for length, and the width or section controlling devices adjusted for any width desired, retaining the same length size. And vice-versa, a set of different lengths can be turned without varying the width. In other words, either the length or the width can be varied, or both.

In operation the work blocks are held between the work spindles which, as stated, are arranged symmetrically around the cutter spindle, and the frames supporting said work spindles are connected together so that the various blocks are moved simultaneously and similarly toward and from the cutter to vary the cross sectional dimensions, said movement being controlled by the follower which acts on the pattern held in its spindle. The cutter moves up and down and rotates as described. The variation in the length and cross sectional dimensions of the work with respect to the pattern is produced by appropriate manipulation of the adjusting devices described.

I claim:

1. The combination in a lathe, of a plurality of work spindles arranged symmetrically around a common center, a cutter at the center, means for so varying the relations of the cutter and said spindles as to produce forms of sizes different from that of the pattern, which means includes pattern controlled means for symmetrically varying the positions of the work spindles with respect to the cutter, to produce a plurality of identical forms.

2. The combination in a lathe, of a plurality of work spindles arranged symmetrically around a common center, a cutter at the center, and means for varying the cross sectional dimensions of the forms produced, relative to the corresponding dimensions of the pattern, including pattern-controlled means for symmetrically varying the positions of the work spindles with respect to the cutter, to produce a plurality of identical forms.

3. The combination in a lathe, of a plurality of work spindles arranged symmetrically around a common center, a cutter at the center, pattern controlled means for symmetrically varying the positions of the work spindles with respect to the cutter, to produce a plurality of identical forms, and means for varying the length of the forms produced, relative to the length of the pattern.

4. The combination with a plural work-spindle lathe, of means for proportionally varying the longitudinal and cross sectional dimensions of the forms produced, relative to the corresponding dimensions of the pattern, including pattern-controlled means for varying the positions of the work-spindles for producing a plurality of identical forms.

5. The combination with a lathe having a series of parallel work spindles arranged symmetrically around a central axis and parallel thereto and a cutter at said axis and a pattern spindle and a follower, and means actuated by the follower to control the action of the cutter with respect to shaping the work, the cutter and follower having relative longitudinal movement with respect to the work and the pattern respectively, of means to vary the longitudinal movement between the cutter and work with respect to the longitudinal movement between the pattern and the follower, to vary the length of the work produced.

6. The combination with a lathe having a series of parallel work spindles arranged symmetrically around a central axis and parallel thereto, a rotary cutter at said axis movable longitudinally with respect thereto, a pattern spindle, a follower movable longitudinally with respect thereto, means actuated by the follower to control the operation of the cutter upon the work, with respect to the cross-section thereof, and means to vary the relative longitudinal movement of the cutter and the follower, to vary the length of the work with respect to the length of the pattern.

7. The combination with a lathe having a plurality of parallel work spindles arranged symmetrically around a central axis and parallel thereto and a cutter at said axis and a pattern spindle and a follower, and means actuated by the follower to control the action of the cutter with respect to shaping the work, the cutter and follower having relative longitudinal movement with respect to the work and the pattern respectively, of means to vary the longitudinal movement between the cutter and work with respect to the longitudinal movement between the pattern and the follower, to vary the length of the work produced.

8. The combination with a lathe having a plurality of work spindles arranged symmetrically around a common center, a rotary cutter at said center and movable longitudinally with respect to the spindles, a pattern spindle, a follower movable longitudinally with respect thereto, means actuated by the follower to control the operation of the cutter upon the work, with respect to the cross-section thereof, and means to vary the relative longitudinal movement of the cutter and the follower, to vary the length of the work with respect to the length of the pattern.

9. In a multiple lathe, the combination of a central rotary cutter, a plurality of parallel work spindles arranged symmetrically around the same, means to produce relative longitudinal movement of the cutter and work spindles, and pattern-controlled means to produce simultaneously and similarly lateral movement of the work spindles with respect to the cutter.

10. In a multiple lathe, the combination of a rotary cutter, a plurality of swinging arms arranged symmetrically around the same, the arms being connected together for similar movement laterally with respect to the cutter, work spindles carried by the arms, means to drive the spindles, means to move the cutter longitudinally with respect to the spindles, and pattern-controlled means to swing the arms.

11. In a multiple lathe, the combination of a rotary cutter, a plurality of spaced swinging upper and lower arms arranged around the cutter, connections between the arms for producing similar lateral swing with respect to the cutter, parallel work spindles carried by the arms, means to drive the spindles, means to move the cutter parallel to the axes of the spindles, and pattern-controlled means to swing the arms.

12. In a multiple lathe, the combination of a frame, a shaft therein, having a cutter at the end, the frame having a plurality of rods arranged around the cutter at equal distances therefrom, sleeves mounted to turn on said rods, spaced swinging arms fixed to the sleeves, work-spindles carried by the arms parallel to the shaft and arranged to hold the work against the cutter, means to drive the spindles, connections between the sleeves to produce similar turning movement of all, means to move the cutter longitudinally with respect to the spindles, and means connected to one of the sleeves to turn the same and swing the arms.

13. In a pattern-controlled lathe, the combination with a cutter movable along the work and a follower movable along the pattern, a feed shaft, rack and pinion devices between the shaft and the cutter to feed the latter, and operative connections between the shaft and the follower, including a sliding rack, a pinion on the shaft engaging the same, a bar adjustable to various angles to the rack, and a bent lever pivoted to the rack and having a sliding connection at one end to the bar and a connection at the other end to the follower.

14. In a pattern-controlled lathe, the combination of a rotary cutter movable along the work, means to drive the same, a rotary axially-parallel follower movable along the pattern, a feed shaft extending at an angle to the line of movement of the cutter and follower, independently-controlled means to drive the feed shaft, means actuated by said feed shaft to produce longitudinal movement of the cutter, and separate adjustable means also actuated by said shaft to produce longitudinal movement of the follower.

15. In a lathe, the combination of a swinging frame carrying a pattern spindle and a work spindle, a cutter adapted to operate on the work, additional swinging frames carrying work spindles, said work spindles being arranged symmetrically around the cutter and said frames being all connected for symmetrical movement with respect to the cutter, a follower arranged to bear against the pattern and thereby swing the frames to form the work, and adjustable means actuated by the swing of the frames to vary the position of the follower relative to the axis of the pattern spindle, to vary the cross sectional dimensions of the forms produced.

16. In a lathe, the combination of a plurality of connected swinging frames each carrying a work spindle, a pattern spindle carried by one of said frames, a cutter adapted to operate on the work, said work spindles being arranged symmetrically around the cutter and connected to move simultaneously, a follower arranged to bear against the pattern and thereby swing the frames to form the work, and means to vary the lateral position of the follower with respect to the pattern spindle, including a spring-pressed slide carrying the follower, a rocker bearing against the slide against the pressure of the springs, the rocker being adjustable to vary its bearing against the slide with respect to its center of oscillation, and a connection between the rocker and one of the frames to rock the former as the latter swings.

17. In a lathe, the combination of a swinging frame, work and pattern spindles carried thereby, a cutter arranged to act on the work and a follower arranged to follow the pattern, means to drive the spindles and the cutter, and means to stop the drive, including a clutch, a hand rod connected thereto, and a projection on the frame arranged to engage and operate the hand rod when the pattern is swung away from the follower.

18. The combination with a frame, of a sectional and extensible shaft having a driving pulley at one end and a rotary cutter head on the other end, a sleeve in which the shaft turns and is supported, mounted in a guide in the frame a having a rack and bearing at its end against the cutter head, and a feed shaft having a pinion engaging the rack, to advance or retract the cutter head.

In testimony whereof, I affix my signature in presence of two witnesses.

ARTHUR B. NORRIS.

Witnesses:
ERNEST HALL COOLIDGE,
GEO. E. TEW.